(12) United States Patent
Kimura

(10) Patent No.: US 9,706,501 B2
(45) Date of Patent: Jul. 11, 2017

(54) COMMUNICATION APPARATUS AND CONTROL METHOD

(71) Applicant: KYOCERA CORPORATION, Kyoto (JP)

(72) Inventor: Takayuki Kimura, Daito (JP)

(73) Assignee: Kyocera Corporation, Kyoto (JP)

( * ) Notice: Subject to any disclaimer, the term of this patent is extended or adjusted under 35 U.S.C. 154(b) by 0 days.

(21) Appl. No.: 15/246,431

(22) Filed: Aug. 24, 2016

(65) Prior Publication Data

US 2016/0366652 A1 Dec. 15, 2016

Related U.S. Application Data

(63) Continuation of application No. PCT/JP2015/055553, filed on Feb. 26, 2015.

(30) Foreign Application Priority Data

Feb. 26, 2014 (JP) .................................. 2014-034857

(51) Int. Cl.
*H04B 7/00* (2006.01)
*H04W 52/24* (2009.01)
(Continued)

(52) U.S. Cl.
CPC ........ *H04W 52/245* (2013.01); *H04B 1/0475* (2013.01); *H04B 1/40* (2013.01);
(Continued)

(58) Field of Classification Search
CPC ...... H04B 5/00; H04B 5/0006; H04B 5/0025; H04B 5/0012; H04B 5/0018; H04B 7/00;
(Continued)

(56) References Cited

U.S. PATENT DOCUMENTS 5,732,340 A * 3/1998 Nishino ................. H03G 3/348
455/212
6,661,783 B1 * 12/2003 Watanabe ........... H04J 13/0048
370/335
(Continued)

FOREIGN PATENT DOCUMENTS

JP 8-307291 A 11/1996
JP 2013-515412 A 5/2013
(Continued)

OTHER PUBLICATIONS

Written Opinion of the International Searching Authority in International Application No. PCT/JP2015/055553 dated May 19, 2015, and Concise Explanation Thereof, in 8 pages.
(Continued)

*Primary Examiner* — Dominic Rego
(74) *Attorney, Agent, or Firm* — Duane Morris LLP

(57) ABSTRACT

A communication apparatus includes an NFC circuit, an FM receiver, a level detector, and an NFC control circuit. The NFC circuit is configured to make wireless communication with a communication apparatus of a communication partner using a specified communication frequency. The FM receiver is configured to adjust a radio reception range to a band including a multiplied frequency of the communication frequency. The level detector is configured to detect a reception level of the band when the FM receiver receives the band including the multiplied frequency. The NFC control circuit is configured to control the NFC circuit to reduce transmission power in the NFC circuit when the reception level is smaller than a predetermined threshold value.

8 Claims, 13 Drawing Sheets

(51) Int. Cl.
    *H04B 1/40*           (2015.01)
    *H04B 5/00*           (2006.01)
    *H04B 1/04*           (2006.01)
    *H04B 15/04*          (2006.01)
    *H04W 4/00*          (2009.01)
    *H04W 52/36*         (2009.01)

(52) U.S. Cl.
    CPC ........... *H04B 5/0031* (2013.01); *H04B 15/04* (2013.01); *H04W 4/008* (2013.01); *H04W 52/36* (2013.01); *H04W 52/362* (2013.01); *H04W 52/367* (2013.01); *Y02B 60/50* (2013.01)

(58) Field of Classification Search
    CPC ........ H04B 7/002; H04B 7/005; H04B 15/02; H04B 1/1027; H04B 5/0075; H04B 1/525; H04B 1/40; H04B 5/0031; H04B 1/0475; H04B 15/04; H04W 52/245; H04W 52/36; H04W 52/362; H04W 52/367; H04W 4/008; Y02B 60/50
    USPC ... 455/41.1, 41.2, 39, 63.4, 121, 575.7, 522, 455/68, 69; 343/787, 788
    See application file for complete search history.

(56) References Cited

U.S. PATENT DOCUMENTS

| | | | |
|---|---|---|---|
| 6,711,390 B1* | 3/2004 | Moers | H03J 1/0083 455/161.2 |
| 9,002,268 B2* | 4/2015 | Desclos | H04B 5/0075 455/41.1 |
| 2001/0051530 A1* | 12/2001 | Shiotsu | H04W 16/14 455/522 |
| 2002/0094034 A1 | 7/2002 | Moriyama | |
| 2005/0043051 A1* | 2/2005 | Takano | H04W 52/40 455/522 |
| 2005/0043052 A1* | 2/2005 | Whinnett | H04W 52/32 455/522 |
| 2006/0047199 A1* | 3/2006 | Miyazawa | A61B 1/00016 600/471 |
| 2006/0133531 A1* | 6/2006 | Iwasaki | H04B 7/0426 375/267 |
| 2008/0212785 A1* | 9/2008 | Ullmann | H04H 20/08 381/2 |
| 2011/0105097 A1* | 5/2011 | Tadayon | H04W 4/025 455/418 |
| 2011/0159911 A1* | 6/2011 | Chen | H04W 52/221 455/522 |
| 2013/0045679 A1* | 2/2013 | Orsatti | H04B 15/06 455/41.1 |
| 2014/0327521 A1* | 11/2014 | Chen | G06Q 10/087 340/8.1 |
| 2014/0329462 A1* | 11/2014 | Khorram | H04W 4/008 455/41.1 |
| 2015/0072615 A1* | 3/2015 | Mofidi | H04B 5/0075 455/41.1 |
| 2015/0072623 A1* | 3/2015 | Mofidi | H04B 15/02 455/63.3 |

FOREIGN PATENT DOCUMENTS

JP         2013-162338 A     8/2013
WO    WO 2011/076385 A1   6/2011

OTHER PUBLICATIONS

International Search Report in International Application No. PCT/JP2015/055553, dated May 19, 2015, in 1 page.

\* cited by examiner

FIG.3

PRESET TABLE 141

| PRESET INFORMATION | | | |
|---|---|---|---|
| PRESET NUMBER | RECEPTION FREQUENCY(MHz) | MULTIPLIED WAVE FLAG | VOLTAGE VALUE |
| 1 | 77.2 | 0 | — |
| 2 | 81.4 | 1 | $V_1$ |
| 3 | 85.4 | 0 | — |
| 4 | 92.1 | 0 | — |
| 5 | 94.9 | 1 | $V_2$ |

PRESET TABLE  141a

| PRESET INFORMATION | | | |
|---|---|---|---|
| PRESET NUMBER | RECEPTION FREQUENCY(MHz) | MULTIPLIED WAVE FLAG | CAPACITOR VALUE |
| 1 | 77.2 | 0 | – |
| 2 | 81.4 | 1 | $C_1$ |
| 3 | 85.4 | 0 | – |
| 4 | 92.1 | 0 | – |
| 5 | 94.9 | 1 | $C_2$ |

142a  143a  144a  145a

146a

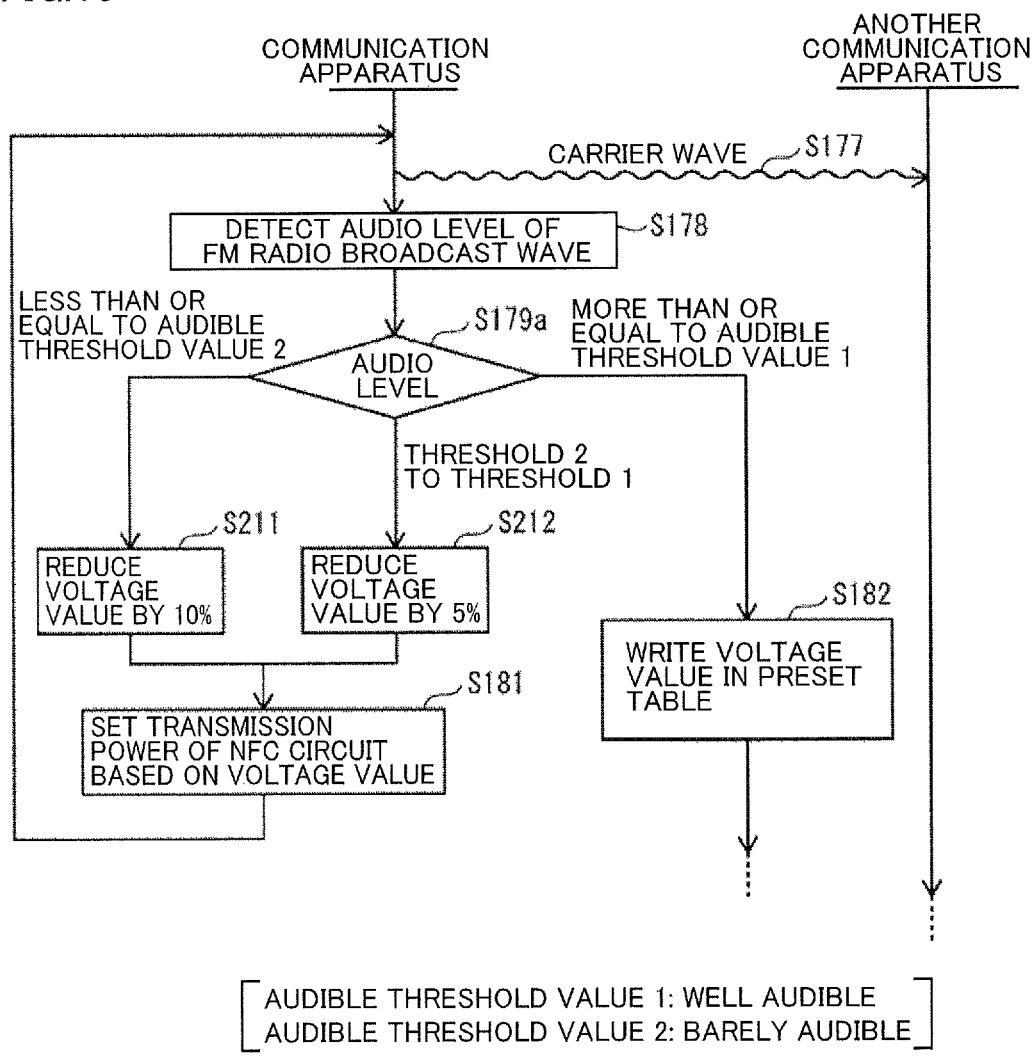

COMMUNICATION APPARATUS AND CONTROL METHOD

CROSS-REFERENCE TO RELATED APPLICATION

The present application is a continuation based on PCT Application No. PCT/JP2015/055553 filed on Feb. 26, 2015, which claims the benefit of Japanese Application No. 2014-034857, filed on Feb. 26, 2014. PCT Application No. PCT/JP2015/055553 is entitled "Communication Device and Control Method", and Japanese Application No. 2014-034857 is entitled "Communication Apparatus and Control Method." The content of which are incorporated by reference herein in their entirety.

FIELD

Embodiments of the present disclosure relate to a technique for controlling a communication apparatus which makes wireless communication and receives FM radio broadcast waves.

BACKGROUND

Near Field Communication (NFC) is used for IC cards serving as electronic money, traffic tickets and the like, a Resident Registration Network System card, an IC tag for use in physical distribution management, and the like. NFC is one of methods of high-frequency wireless communication applied between communication apparatuses spaced apart by about 10 cm. In NFC, a communication wave including a frequency of 13.56 MHz is used.

In FM radio broadcasting, a frequency band ranging from 76 MHz to 108 MHz is used.

SUMMARY

An embodiment of the present disclosure is a communication apparatus including a wireless communication unit, an FM receiver, a detector, and at least one processor. The wireless communication unit is configured to make wireless communication with a communication apparatus of a communication partner using a specified communication frequency. The FM receiver is configured to adjust a radio reception range to a band including a multiplied frequency of the communication frequency. The detector is configured to detect a reception level of the band when the FM receiver receives the band including the multiplied frequency. The at least one processor is configured to control the wireless communication unit to reduce transmission power in the wireless communication unit when the reception level is smaller than a predetermined threshold value.

The foregoing and other objects, features, aspects and advantages of the present disclosure will become more apparent from the following detailed description of the present disclosure when taken in conjunction with the accompanying drawings.

BRIEF DESCRIPTION OF THE DRAWINGS

FIG. 3 shows a data structure of a preset table.

FIG. 8 shows a data structure of a preset table in a communication apparatus.

FIG. 13 is a flowchart showing an operation of communication processing in a communication apparatus according to Variation 4.

DETAILED DESCRIPTION

1. Embodiments

A communication system 10 as an embodiment will be described.

Figure 1:
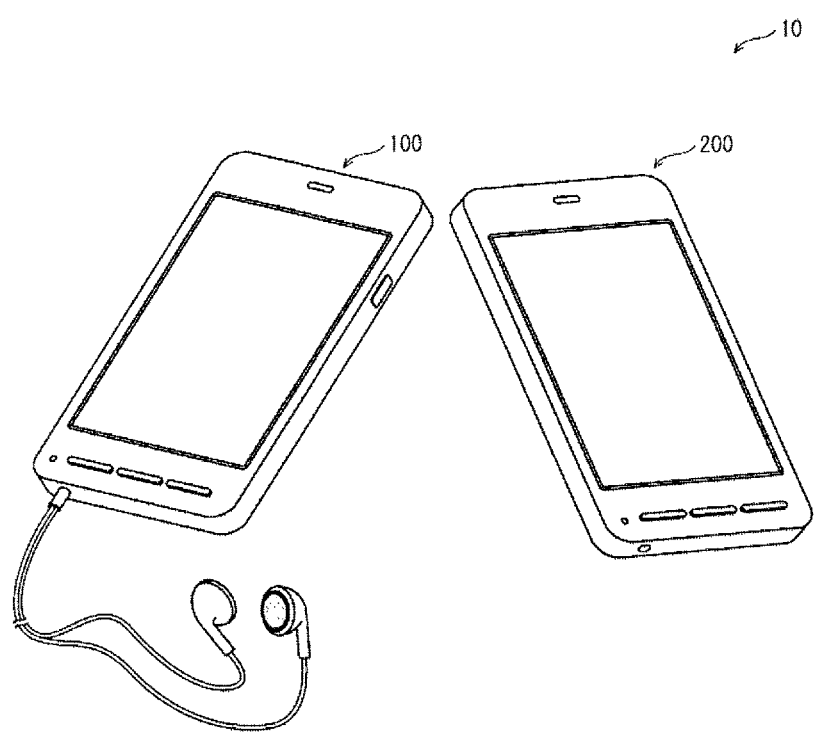
FIG. 1 shows a configuration of a communication system according to an embodiment of the disclosure.

Communication system 10 can include communication apparatuses 100 and 200, as shown in FIG. 1.

Communication apparatus 100 can store therein video and audio data as an example. Communication apparatus 100 can transmit video and audio data stored therein to communication apparatus 200 using NFC. Communication apparatus 200 can receive video and audio data using NFC, and can store therein the received video and audio data. Communication apparatus 100 can receive FM radio broadcasting.

A multiplied frequency of a communication frequency used in NFC can fall on a reception frequency of FM radio broadcasting. For example, 81.4 MHz which is 6 times the NFC communication frequency (13.56 MHz) and 94.9 MHz which is 7 times the NFC communication frequency may be included in the frequency band of FM radio broadcasting. Therefore, when a communication apparatus making near field radio communication and receiving FM radio broadcast waves tunes to an FM radio broadcast wave of 81.4 MHz or 94.9 MHz during near field radio communication, reception of the FM radio broadcast wave is disadvantageously interfered with by multiplied waves of the communication frequency used by the near field radio communication.

Communication apparatus 100 can reduce stepwise the value of a voltage to be supplied to a circuit for generating an NFC carrier wave until the audio level of the received FM radio broadcasting becomes equal to or larger than an audible threshold value. Transmission power of the communication wave emitted from communication apparatus 100 can be reduced. The reception interference with an FM radio broadcast wave by multiplied waves of a communication frequency used by near field radio communication can be reduced.

1.1 Communication Apparatus 100

Communication apparatus 100 can use NFC to transmit/receive data to/from a communication apparatus of a communication partner, and to receive an FM radio broadcast wave and output it as sound. Communication apparatus 100 may include a telephone function, an e-mail communication function, a video display function, and the like.

Figure 2:
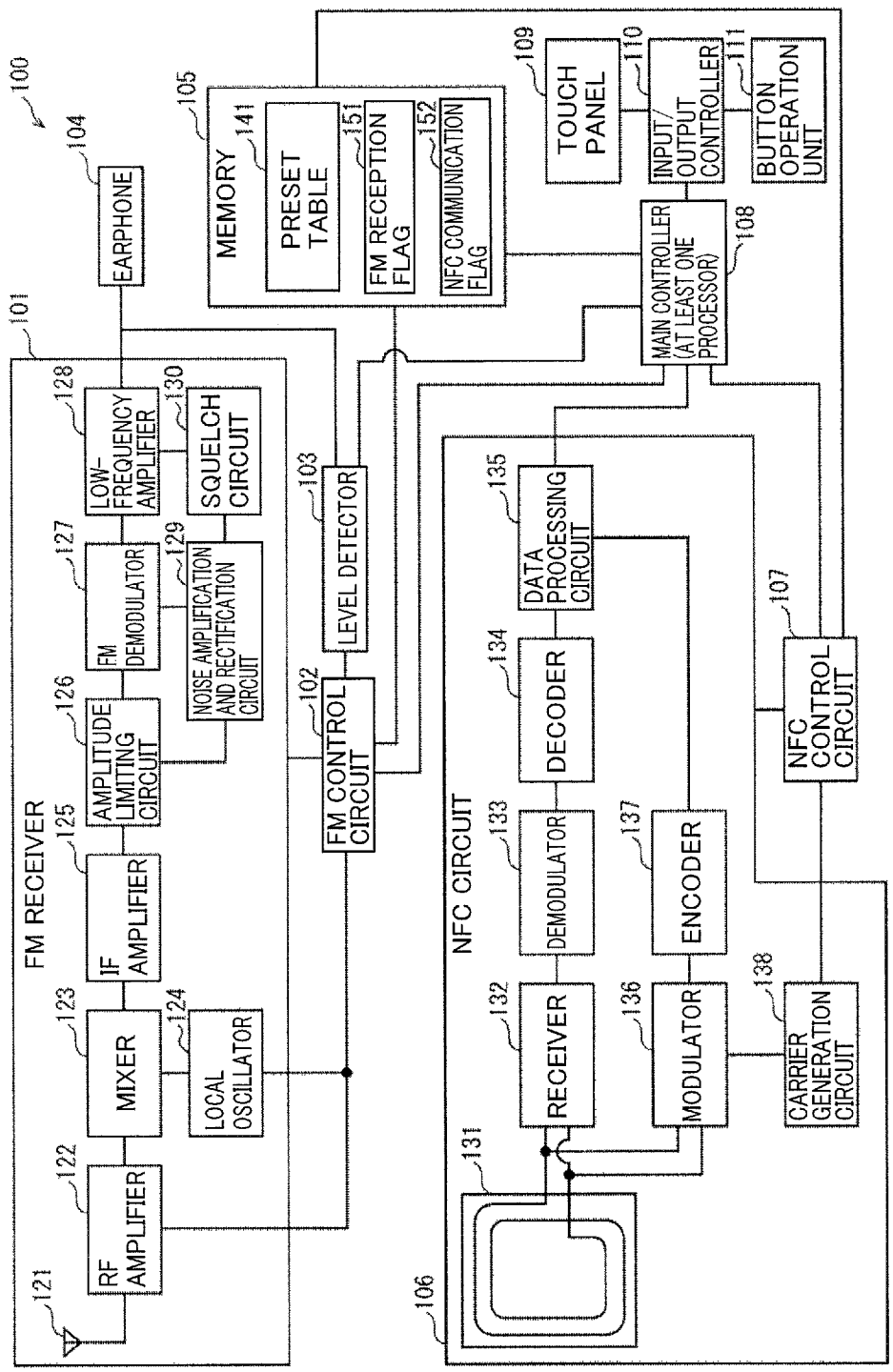
FIG. 2 is a block diagram showing a configuration of a communication apparatus.

As shown in FIG. 2, communication apparatus 100 can include an FM receiver 101, an FM control circuit 102, a level detector 103, a memory 105, an NFC circuit 106, an NFC control circuit 107, a main controller 108, a touch panel 109, an input/output controller 110, a button operation unit 111, and other circuits. An earphone 104 may be connected to communication apparatus 100.

Since communication apparatus 200 is configured similarly to communication apparatus 100, detailed description will not be given. As an example, each of communication apparatuses 100 and 200 may be a mobile phone.

(1) Memory 105

Memory 105 can be implemented by a nonvolatile semiconductor memory as an example.

Memory 105 can store therein a preset table 141, an FM reception flag 151, an NFC communication flag 152, video, audio data, other types of data, and computer programs.

(FM Reception Flag 151)

FM reception flag 151 is a flag indicating whether or not FM receiver 101 is receiving FM radio broadcast waves. FM reception flag 151 takes either the value "0" or "1". The value "0" indicates that FM receiver 101 is not receiving FM radio broadcast waves. The value "1" indicates that FM receiver 101 is receiving FM radio broadcast waves.

(NFC Communication Flag 152)

NFC communication flag 152 is a flag indicating whether or not NFC circuit 106 is making near field radio communication. NFC communication flag 152 takes either the value "0" or "1". The value "0" indicates that NFC circuit 106 is not making near field radio communication. The value "1" indicates that NFC circuit 106 is making near field radio communication.

(Preset Table 141)

Preset table 141 is a data table for storing therein frequencies of FM radio broadcast waves that can be received by FM receiver 101. Preset table 141 includes an area for storing a plurality of pieces of preset information as shown in FIG. 3. Each piece of preset information corresponds to one FM radio broadcast wave. Each piece of preset information includes a preset number, a reception frequency, a multiplied wave flag, and a voltage value in association with one another.

The preset number is an identification number for uniquely identifying the preset information in which the preset number is included.

The reception frequency indicates a frequency of FM radio broadcast waves that can be received by FM receiver 101. This frequency is expressed in the unit MHz.

The multiplied wave flag is a flag indicating whether or not a corresponding reception frequency is a multiplied wave of the NFC communication frequency (13.56 MHz). The multiplied wave flag takes either the value "0" or "1". The value "0" indicates that the corresponding reception frequency is not a multiplied wave of the NFC communication frequency. The value "1" indicates that the corresponding reception frequency is a multiplied wave of the NFC communication frequency.

The voltage value indicates a value of a voltage to be set for a carrier generation circuit 138 of NFC circuit 106 which will be described later.

Preset table 141 includes preset information 146 as an example, as shown in FIG. 3. As an example, preset information 146 includes a preset number 142 of "2", a reception frequency 143 of "81.4", a multiplied wave flag 144 of "1", and a voltage value 145 of "V1" in association with one another. Reception frequency 143 of "81.4" (MHz) is a multiplied wave of the communication frequency (13.56 MHz). Multiplied wave flag 144 of "1" indicates that reception frequency 143 is a multiplied wave.

(2) FM Receiver 101

FM receiver 101 is a superheterodyne-type FM radio receiver. FM receiver 101 can adjust by tuning a reception range to a band including multiplied frequencies of the NFC communication frequency. As shown in FIG. 2, FM receiver 101 can include an antenna circuit 121, an RF amplifier 122, a mixer 123, a local oscillator 124, an IF amplifier 125, an amplitude limiting circuit 126, an FM demodulator 127, a low-frequency amplifier 128, a noise amplification and rectification circuit 129, and a squelch circuit 130.

Antenna circuit 121 can receive broadcast waves. A cable connecting earphone 104 and communication apparatus 100 can also serve as antenna circuit 121.

RF amplifier 122 can tune in a user's desired FM radio broadcast wave among the broadcast waves received by antenna circuit 121, in accordance with a tuning instruction from FM control circuit 102. RF amplifier 122 can amplify the tuned FM radio broadcast wave, and can output an amplified high frequency signal to mixer 123.

Local oscillator 124 can generate a local oscillation signal for converting the received FM radio broadcast wave into an intermediate frequency in accordance with the tuning instruction from FM control circuit 102. Local oscillator 124 can output the generated local oscillation signal to mixer 123.

Mixer 123 can generate an intermediate frequency signal of an intermediate frequency from the high frequency signal amplified by RF amplifier 122 and the local oscillation signal generated by local oscillator 124. The intermediate frequency is 10.7 MHz as an example.

IF amplifier 125 can amplify the intermediate frequency signal generated by mixer 123. IF amplifier 125 can output the amplified intermediate frequency signal to amplitude limiting circuit 126.

Amplitude limiting circuit 126 can remove a portion with more than or equal to a certain amplitude from the amplified intermediate frequency signal. Amplitude limiting circuit 126 can output the intermediate frequency signal from which the portion with more than or equal to a certain amplitude has been removed to FM demodulator 127.

FM demodulator 127 can perform FM demodulation on the intermediate frequency signal from which the portion with more than or equal to a certain amplitude has been removed, and can generate an audio signal. FM demodulator 127 can output the generated audio signal to low-frequency amplifier 128.

Low-frequency amplifier 128 can amplify the audio signal generated by FM demodulator 127.

Earphone 104 can convert the audio signal amplified by low-frequency amplifier 128 into sound, and can output the sound.

Noise amplification and rectification circuit 129 can receive a noise signal from amplitude limiting circuit 126 and FM demodulator 127. Noise amplification and rectification circuit 129 can amplify and rectify the received noise signal. Noise amplification and rectification circuit 129 can output the amplified and rectified noise signal to squelch circuit 130.

Squelch circuit 130 can stop low-frequency amplifier 128 when noise exceeds a reference level.

(3) FM Control Circuit 102

FM control circuit 102 can receive from main controller 108 an instruction for automatic tuning for FM radio broadcasting and an instruction to receive a FM radio broadcast wave including the reception frequency tuned by a user.

(Processing of Receiving FM Radio Broadcast Waves Including Reception Frequency Tuned by User)

Upon receipt of an instruction to receive an FM radio broadcast wave including the reception frequency tuned by a user from main controller 108, FM control circuit 102 can instruct tuning of the FM radio broadcast wave to RF amplifier 122 and local oscillator 124. FM receiver 101 receives the FM radio broadcast wave.

FM control circuit 102 can cause FM receiver 101 to continue receiving the FM radio broadcast wave including the reception frequency until an instruction to terminate the reception or designation of another reception frequency from main controller 108.

(Automatic Tuning for FM Radio Broadcasting)

Upon receipt of an instruction for automatic tuning for FM radio broadcasting, FM control circuit 102 can cause FM receiver 101 to scan the reception frequency from the lower limit frequency of 76.0 MHz of the FM radio broadcasting band toward the upper limit frequency of 108.0 MHz as shown below. When receivable broadcast waves are detected, FM control circuit 102 can write reception frequencies in the detected order in preset table 141 together with their preset numbers.

FM control circuit 102 can initialize preset table 141 stored in memory 105.

FM control circuit 102 can repeat the following operations (a) through (g) for the reception frequencies in 0.1-MHz increments from the lower limit frequency of 76.0 MHz to the upper limit frequency of 108.0 MHz. Specifically, each of the reception frequencies of 76.0 MHz, 76.1 MHz, 76.2 MHz, 76.3 MHz, . . . , 107.9 MHz, and 108.0 MHz can be subjected to processing.

(a) FM control circuit 102 can output the reception frequencies to RF amplifier 122 and local oscillator 124.

(b) FM control circuit 102 can operate antenna circuit 121, RF amplifier 122, mixer 123, local oscillator 124, IF amplifier 125, amplitude limiting circuit 126, FM demodulator 127, low-frequency amplifier 128, noise amplification and rectification circuit 129, and squelch circuit 130 of FM receiver 101.

(c) FM control circuit 102 can cause level detector 103 to detect an audio level, FM control circuit 102 can receive the audio level from level detector 103.

(d) FM control circuit 102 can compare the received audio level with a tuning threshold value. The tuning threshold value indicates a sufficient audio level at which an FM radio broadcast wave can be received.

(d-1) When the received audio level is smaller than the tuning threshold value, FM control circuit 102 performs nothing.

(d-2) When the received audio level is larger than or equal to the tuning threshold value, the following operations (e) to (g) can be performed.

(e) FM control circuit 102 can set the preset number. When setting the preset number initially, the preset number is set at "1". When setting the second and subsequent preset numbers, each preset number is set by adding "1" to "a previously set preset number."

(f) FM control circuit 102 can write the preset number having been set and the reception frequency in the preset information of preset table 141.

(g) FM control circuit 102 can determine whether or not the reception frequency is a multiplied frequency. That is, FM control circuit 102 can determine whether the reception frequency is 81.4 MHz, 94.9 MHz or another frequency.

(g-1) When the reception frequency is a multiplied frequency, FM control circuit 102 can write the multiplied wave flag of "1" in the preset information.

(g-2) When the reception frequency is not a multiplied frequency, FM control circuit 102 can write the multiplied wave flag of "0" in the preset information.

In this manner, FM control circuit 102 can write the preset information including the preset number, reception frequency, and multiplied wave flag in preset table 141 for a receivable FM radio broadcast wave.

(4) Level Detector 103

When FM receiver 101 receives a band including multiplied frequencies of the NFC communication frequency, level detector 103 can detect the reception level of that band as shown below.

Level detector 103 can detect the audio level of a received FM radio broadcast wave based on the audio signal output from low-frequency amplifier 128. Level detector 103 can output the detected audio level to FM control circuit 102. Level detector 103 can output the detected audio level to NFC control circuit 107 via main controller 108.

Level detector 103 may output the detected audio level directly to NFC control circuit 107 without passing through main controller 108.

(5) NFC Circuit 106

NFC circuit 106 can make bidirectional near field radio communication with a communication apparatus of a communication partner, for example with communication apparatus 200, using a communication wave of a defined communication frequency of 13.56 MHz.

NFC circuit 106 can include an antenna circuit 131, a receiver 132, a demodulator 133, a decoder 134, a data processing circuit 135, a modulator 136, an encoder 137, and carrier generation circuit 138, as shown in FIG. 2.

Antenna circuit 131 includes a closed loop coil, and can output an electromagnetic wave with variations in a current flowing in this coil. With variations in a magnetic flux passing through the coil serving as antenna circuit 131, a current flows into antenna circuit 131.

Receiver 132 can receive the current flowing in antenna circuit 131, can tune the received current, and can output the tuned current to demodulator 133.

Demodulator 133 can demodulate a signal supplied from receiver 132, and can supply the demodulated signal to decoder 134.

Decoder 134 can decode, for example, a Manchester code or the like which is a signal supplied from demodulator 133, and can supply data obtained as a result of decoding, to data processing circuit 135.

Data processing circuit 135 can perform, for example, processing to be performed by a protocol, such as a transport layer and other predetermined processing, based on the data supplied from decoder 134. Data processing circuit 135 can supply data to be transmitted to a communication apparatus of a communication partner to encoder 137.

Encoder 137 can encode the data supplied from data processing circuit 135 into, for example, a Manchester code or the like for supply to modulator 136.

Carrier generation circuit 138 can generate a carrier wave of the communication frequency, and can output the generated carrier wave to modulator 136.

Modulator 136 can receive the carrier wave from carrier generation circuit 138. Modulator 136 can modulate the received carrier wave in accordance with a signal supplied from encoder 137. Modulator 136 can output the modulated carrier wave to antenna circuit 131. Antenna circuit 131 can emit the modulated wave as a communication wave.

As a modulation method in modulator 136, amplitude modulation (ASK (Amplitude Shift Keying)) can be employed, for example. However, the modulation method is not limited to ASK. PSK (Phase Shift Keying), QAM (Quadrature Amplitude Modulation), and another modulation method may be employed.

(6) NFC Control Circuit 107

When the reception level by level detector 103 is smaller than the audible threshold value, NFC control circuit 107 can control NFC circuit 106 to reduce transmission power in NFC circuit 106 within the range in which near field radio communication can be made, as shown below.

NFC control circuit 107 receives an instruction to make communication by NFC from main controller 108. Upon receipt of the instruction, NFC control circuit 107 can control NFC circuit 106 to make communication by NFC as shown below.

NFC control circuit 107 can determine whether or not an FM broadcast wave is being received by FM receiver 101. Specifically, NFC control circuit 107 can determine whether FM reception flag 151 stored in memory 105 indicates "0" or "1". When an FM broadcast wave is not being received, NFC control circuit 107 does not perform processing of reducing transmission power of the communication wave emitted from NFC circuit 106 shown below.

When an FM broadcast wave is being received, that is, when FM reception flag 151 indicates "1", NFC control circuit 107 can read preset information including the reception frequencies of the FM radio broadcast wave being received from preset table 141.

NFC control circuit 107 can extract a multiplied wave flag from the read preset information. NFC control circuit 107 can determine whether the extracted multiplied wave flag indicates "0" or "1". In other words, NFC control circuit 107 can determine whether or not the FM radio broadcast wave being received is a multiplied wave of the NFC communication wave. When the extracted multiplied wave flag indicates "0", NFC control circuit 107 does not perform processing of reducing transmission power of the communication wave emitted from NFC circuit 106 shown below.

When the multiplied wave flag indicates "1", NFC control circuit 107 can determine whether or not the read preset information includes the voltage value. When the read preset information includes a voltage value, NFC control circuit 107 can set the transmission power of carrier generation circuit 138 of NFC circuit 106 based on the voltage value included in the preset information. When the read preset information does not include a voltage value, NFC control circuit 107 can set the transmission power of carrier generation circuit 138 of NFC circuit 106 based on a predetermined default value.

When the FM radio broadcast wave is not received simultaneously with communication by NFC, or when FM radio broadcast wave including a reception frequency equivalent to the multiplied wave of the NFC communication wave is not received simultaneously with communication by NFC, the default value is a voltage value set for carrier generation circuit 138 of NFC circuit 106.

NFC control circuit 107 can control NFC circuit 106 to emit a carrier wave with no data signal carried thereon. Emission of a carrier wave with no data signal carried thereon may be performed continuously until immediately before emission of a carrier wave with a data signal carried thereon.

NFC control circuit 107 can receive an audio level from level detector 103 via main controller 108. NFC control circuit 107 can compare the received audio level with an audible threshold value.

The audible threshold value is a value of 20% of the peak to peak value of the audio signal (voltage value) output from FM receiver 101, as an example. That is, it is a value of 20% of the difference between the maximum voltage value and the minimum voltage value.

When the audio level is larger than or equal to the audible threshold value, NFC control circuit 107 can write the voltage value in preset table 141. The voltage value written in preset table 141 is used when next receiving an FM radio broadcast wave including a frequency identical to that of the FM radio broadcast wave being received and making communication by NFC. NFC control circuit 107 can control data processing circuit 135, encoder 137, modulator 136, antenna circuit 131, and carrier generation circuit 138 to repeat data transmission.

When the audio level is smaller than the audible threshold value, NFC control circuit 107 can reduce the voltage value by 10% as an example. NFC control circuit 107 can set the transmission power of carrier generation circuit 138 of NFC circuit 106 based on the reduced voltage value.

NFC control circuit 107 can repeat controlling emission of the carrier wave with no data carried thereon, receiving the audio level, comparing the audio level and the audible threshold value, reducing the voltage value, and setting the transmission power.

As described above, NFC control circuit 107 can exert control so as to reduce the transmission power of NFC circuit 106 stepwise until the reception level becomes equal to or larger than the audible threshold value.

(7) Main Controller 108

Main controller 108 can control the remaining components constituting communication apparatus 100.

Specifically, main controller 108 is implemented by at least one microprocessor. The at least one microprocessor can operate in accordance with a computer program stored in memory 105.

Main controller 108 can receive an input signal corresponding to a user's operation from touch panel 109 or button operation unit 111. The user's operation includes automatic tuning for FM radio broadcasting, selection of a reception frequency of FM radio broadcasting, an instruction to make communication by NFC, and other operations. Main controller 108 can determine the type of a user's operation based on the received input signal.

When the user's operation is automatic tuning for FM radio broadcasting, main controller 108 can determine whether or not near field radio communication is being made by NFC circuit 106. This determination can be made using NFC communication flag 152. When NFC communication flag 152 indicates "0", main controller 108 can instruct FM control circuit 102, level detector 103 and FM receiver 101 to perform processing of automatic tuning for FM radio broadcasting. When NFC communication flag 152 indicates "1", main controller 108 does not instruct FM control circuit 102, level detector 103 and FM receiver 101 to perform processing of automatic tuning for FM radio broadcasting. This is to avoid the influence that would be caused by the communication wave emitted from NFC circuit 106.

When the user's operation is selection of a reception frequency of FM radio broadcasting, main controller 108 can instruct FM control circuit 102 to receive an FM radio broadcast wave including the selected reception frequency.

When the user's operation is the instruction to make communication by NFC, main controller 108 can set NFC communication flag 152 at "1". Main controller 108 can instruct NFC control circuit 107 to make communication by NFC. When the near field radio communication by NFC circuit 106 is terminated, main controller 108 can set NFC communication flag 152 at "0".

When the user's operation is another operation, main controller 108 can perform other processing.

(8) Touch Panel 109, Input/Output Controller 110 and Button Operation Unit 111

(Touch Panel 109)

Touch panel 109 can include a touchpad 109a and a display panel 109b. Display panel 109b may include a rectangular display surface, for example, and touchpad 109a may be located on the display surface. Display panel 109b can be implemented by a liquid crystal display as an example. Display panel 109b can display a screen including icons or the like and other objects received from main controller 108 via input/output controller 110. Touchpad 109a can detect a contact position of an operated object on the display surface of touch panel 109, and can output the detected contact position to input/output controller 110 as an input signal.

(Button Operation Unit 111)

Button operation unit 111 can include a plurality of buttons. Each button may be located on a side surface or a top surface of communication apparatus 100, for example. Each button may be operated, for example, by being pressed by a user in order to receive an operation.

One of the buttons is used for causing an option menu to be displayed, as an example. Another one of the buttons is used for causing a desktop to be displayed, as an example. Still another one of the buttons is used for turning on/off a power source, as an example.

When each button is operated, button operation unit 111 can output an operation signal indicating an operation on each button to main controller 108 via input/output controller 110 as an input signal.

(Input/Output Controller 110)

Input/output controller 110 can relay input/output of information between touch panel 109 and main controller 108. Input/output controller 110 can receive an input signal from button operation unit 111, and can output the received input signal to main controller 108.

1.2 Operation of Communication Apparatus 100

An operation of communication apparatus 100 will be described.

(1) Operation of Communication Apparatus 100

Figure 4:
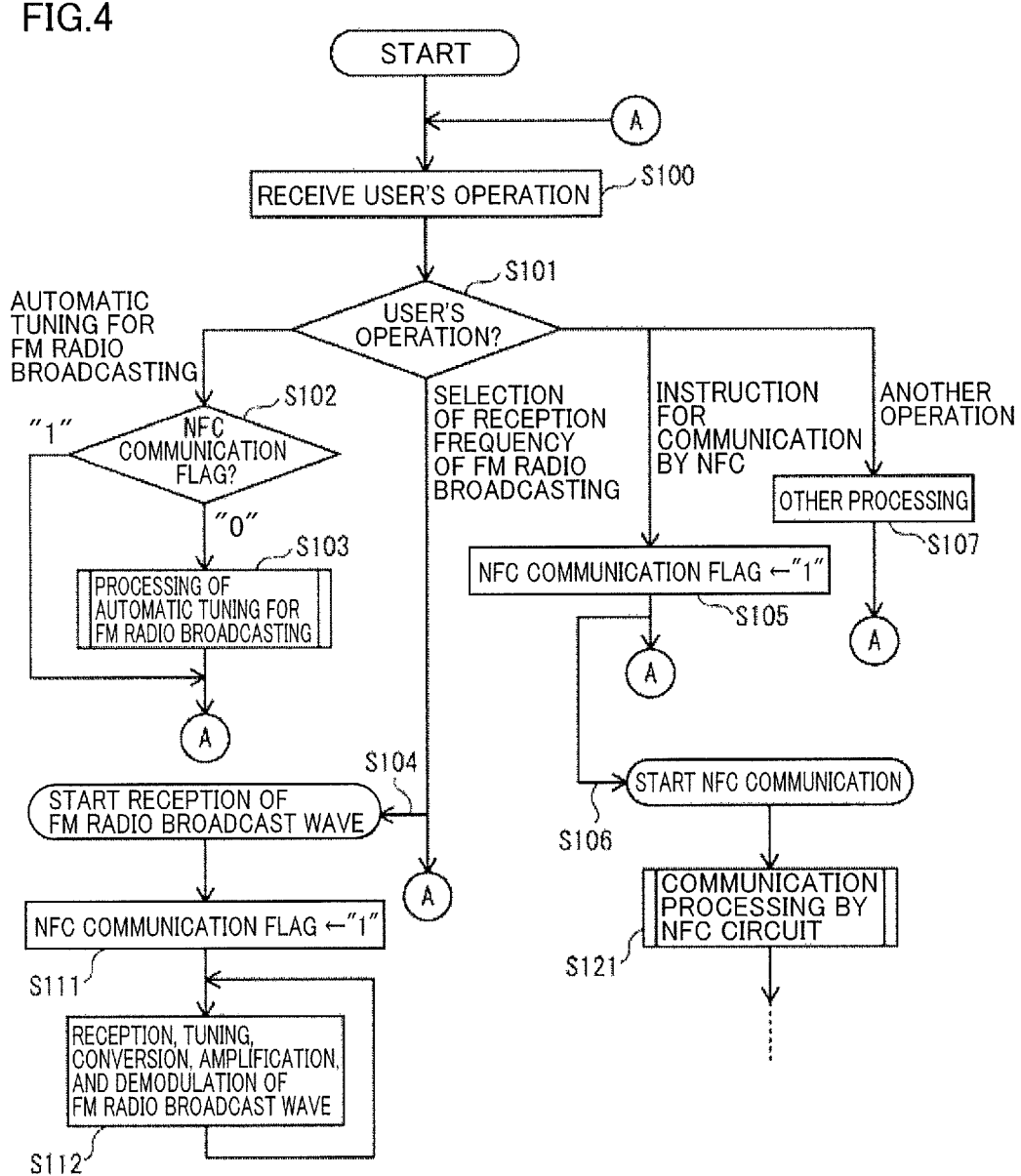
FIG. 4 is a flowchart showing an operation of a communication apparatus.

An operation of communication apparatus 100 will be described with reference to the flowchart shown in FIG. 4.

Touch panel 109 or button operation unit 111 can receive a user's operation. Touch panel 109 or button operation unit 111 can output an input signal corresponding to an operation to main controller 108 (step S100).

Main controller 108 can determine the type of the operation based on the received input signal (step S101). When the operation is automatic tuning for FM radio broadcasting ("automatic tuning for FM radio broadcasting" in step S101), main controller 108 can determine whether NFC communication flag 152 indicates "0" or "1" (step S102). When NFC communication flag 152 indicates "1" ("1" in step S102), the process returns to step S100 to repeat the processing. When NFC communication flag 152 indicates "0" ("0" in step S102), FM control circuit 102, level detector 103 and FM receiver 101 can perform processing of automatic tuning for FM radio broadcasting in accordance with an instruction from main controller 108 (step S103). Then, the process returns to step S100 to repeat the processing.

When the operation is selection of the reception frequency of FM radio broadcasting ("selection of reception frequency of FM radio broadcasting" in step S101), main controller 108 can instruct FM control circuit 102 to receive an FM radio broadcast wave including the selected reception frequency (step S104). The process returns to step S100 to repeat the processing. Upon receipt of the instruction to receive an FM radio broadcast wave including the selected reception frequency, FM control circuit 102 can set FM reception flag 151 at "1" (step S111). FM receiver 101 can perform reception, tuning, RF amplification, conversion, IF amplification, FM demodulation, low frequency amplification, and noise rejection on the broadcast wave including the frequency designated by FM control circuit 102 (step S112). Reception, tuning, RF amplification, conversion, IF amplification, FM demodulation, low frequency amplification, and noise rejection on the broadcast wave may be continuously performed until an instruction to terminate or designation of another reception frequency is received from FM control circuit 102.

When the operation is the instruction to make communication by NFC ("instruction for communication by NFC" in step S101), main controller 108 can set NFC communication flag 152 at "1" (step S105). Main controller 108 can instruct NFC control circuit 107 to make communication by NFC (step S106). The process returns to step S100 to repeat the processing. If the instruction to make communication by NFC is received, NFC control circuit 107 and NFC circuit 106 can make near field radio communication processing (step S121).

When the operation is another operation ("another operation" in step S101), main controller 108 can perform other processing (step S107). The process returns to step S100 to repeat the processing.

(2) Operation of Automatic Tuning for FM Radio Broadcasting

Figure 5:
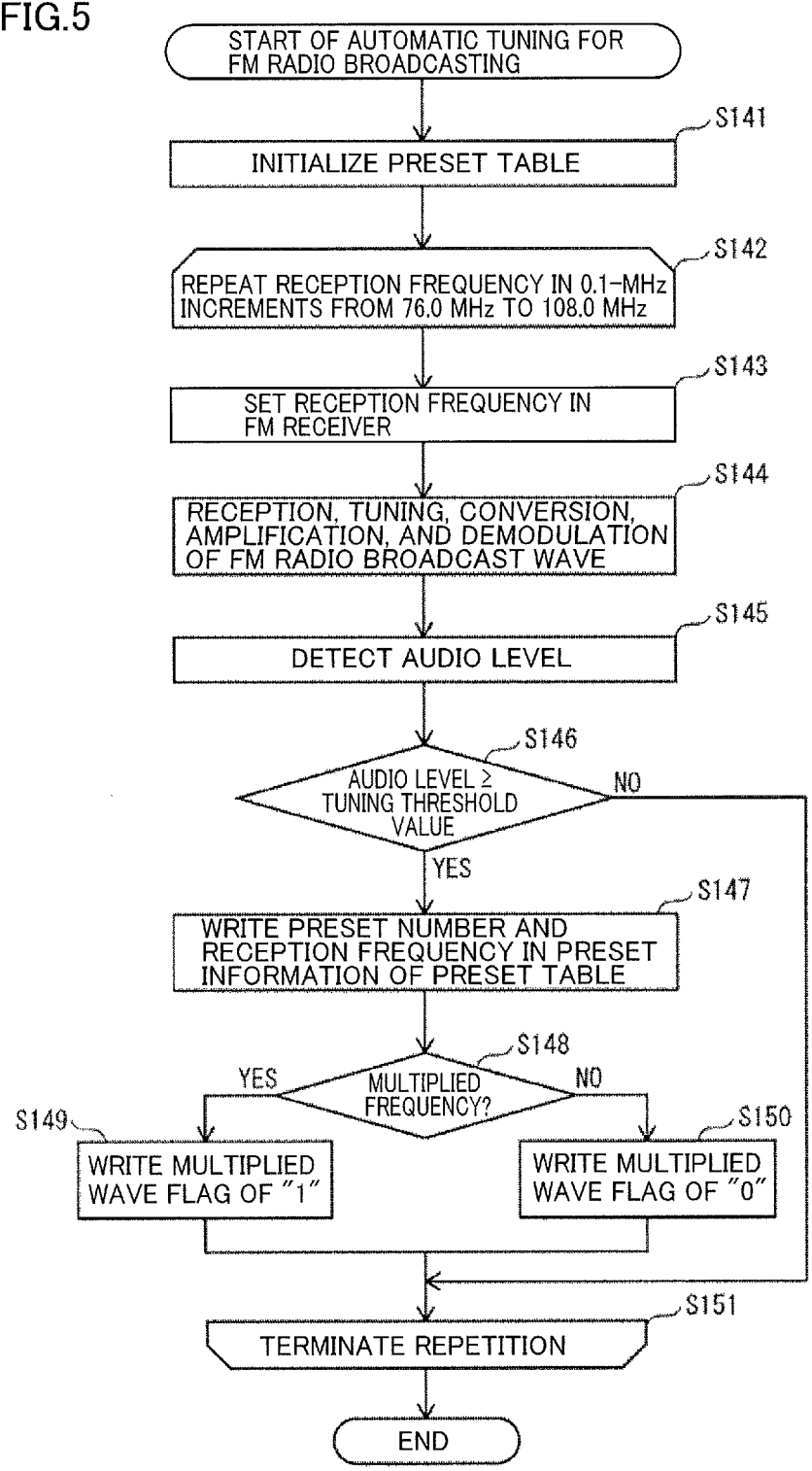
FIG. 5 is a flowchart showing an operation of automatic tuning for FM radio broadcasting.

FM control circuit 102 can cause FM receiver 101 to scan the reception frequency from the lower limit frequency toward the upper limit frequency of the FM radio broadcasting band. When a receivable broadcast wave is detected, FM control circuit 102 can write the reception frequencies in the detected order in preset table 141 together with their preset numbers. The operation of automatic tuning for FM radio broadcasting performed by FM receiver 101, FM control circuit 102 and level detector 103 will be described with reference to the flowchart shown in FIG. 5.

FM control circuit 102 can initialize preset table 141 stored in memory 105 (step S141). FM control circuit 102 can repeat steps S143 through S150 for the reception frequencies in 0.1-MHz increments from the lower limit frequency of 76.0 MHz to the upper limit frequency of 108.0 MHz (steps S142 to S151).

FM control circuit 102 can output the reception frequency to RF amplifier 122 and local oscillator 124 of FM receiver 101 (step S143).

Antenna circuit 121 can receive broadcast waves. RF amplifier 122 can tune in a user's desired FM radio broadcast wave, and can amplify the tuned FM radio broadcast wave. Local oscillator 124 can generate a local oscillation signal. Mixer 123 can generate an intermediate frequency signal of an intermediate frequency. IF amplifier 125 can amplify the intermediate frequency signal. Amplitude limiting circuit 126 can remove a portion with more than or equal to a certain amplitude from the amplified intermediate frequency signal. FM demodulator 127 can perform FM demodulation on the intermediate frequency signal. Low-frequency amplifier 128 can amplify the audio signal generated by FM demodulator 127. When noise exceeds a reference level, noise amplification and rectification circuit 129 and squelch circuit 130 can stop low-frequency amplifier 128 (step S144).

Level detector 103 can detect the audio level from the audio signal output from low-frequency amplifier 128, and can output the detected audio level to FM control circuit 102. FM control circuit 102 can receive the audio level from level detector 103 (step S145).

FM control circuit 102 can compare the received audio level with a tuning threshold value (step S146). When the received audio level is higher than or equal to the tuning threshold value ("YES" in step S146), FM control circuit 102 can set the preset number. The preset number having been set and the reception frequency can be written in the preset information of preset table 141 (step S147).

FM control circuit 102 can determine whether or not the reception frequency is a multiplied frequency (step S148). When the reception frequency is a multiplied frequency ("YES" in step S148), FM control circuit 102 can write the multiplied wave flag of "1" in the preset information (step S149). When the reception frequency is not a multiplied frequency ("NO" in step S148), FM control circuit 102 can write the multiplied wave flag of "0" in the preset information (step S150).

When the received audio level is lower than the tuning threshold value ("NO" in step S146), FM control circuit 102 performs nothing.

In this manner, FM control circuit 102 can write the preset information including the preset number, reception frequency and multiplied wave flag in preset table 141 for receivable FM radio broadcast waves.

(3) Operation of Communication Processing by NFC

Operation of communication processing by NFC between communication apparatuses 100 and 200 will be described with reference to the flowchart shown in FIG. 6.

NFC control circuit 107 can determine whether FM reception flag 151 stored in memory 105 indicates "0" or "1" (step S171). When FM reception flag 151 indicates "1" ("1" in step S171), NFC control circuit 107 can read preset information including the reception frequency of the FM radio broadcast wave being received from preset table 141 (step S172).

NFC control circuit 107 can extract a multiplied wave flag from the read preset information. NFC control circuit 107 can determine whether the extracted multiplied wave flag indicates "0" or "1" (step S173). When the multiplied wave flag indicates "1" ("1" in step S173), NFC control circuit 107 can determine whether or not the read preset information includes the voltage value (step S174). When the read preset information includes a voltage value ("present" in step S174), NFC control circuit 107 can set the transmission power of carrier generation circuit 138 of NFC circuit 106 based on the voltage value included in the preset information (step S175).

When the read preset information does not include a voltage value ("absent" in step S174), NFC control circuit 107 can set the transmission power of carrier generation circuit 138 of NFC circuit 106 based on a predetermined default value (step S176). NFC circuit 106 can emit a carrier wave with no data signal carried thereon by the control of NFC control circuit 107 (step S177).

Level detector 103 can detect the audio level of an FM radio broadcast wave, and can output the detected audio level to NFC control circuit 107 via main controller 108. NFC control circuit 107 can receive the audio level from level detector 103 via main controller 108 (step S178).

NFC control circuit 107 can compare the received audio level with the audible threshold value (step S179). When the audio level is larger than or equal to the audible threshold value ("YES" in step S179), NFC control circuit 107 can write the voltage value in preset table 141 (step S182).

NFC control circuit 107 can cause data processing circuit 135, encoder 137, modulator 136, antenna circuit 131, and carrier generation circuit 138 to repeat data transmission (steps S183, S184, S185, and S186). Communication apparatus 200 can repeat data reception (step S183, S184, S185, . . . , and S186). Data transmission/reception by NFC is terminated.

When the audio level is smaller than the audible threshold value ("NO" in step S179), NFC control circuit 107 can reduce the voltage value by 10% (step S180). NFC control circuit 107 can set the transmission power of carrier generation circuit 138 of NFC circuit 106 based on the reduced voltage value (step S181). The process returns to step S177 to repeat the processing.

When FM reception flag 151 indicates "0" ("0" in step S171) and the multiplied wave flag indicates "0" ("0" in step S173), NFC control circuit 107 shifts control to step S183.

1.3 Conclusion

As described above, the voltage value supplied to carrier generation circuit 138 of NFC circuit 106 is reduced stepwise until the audio level becomes equal to or larger than the audible threshold value, thereby reducing the transmission power of the communication wave to be emitted. The reception interference with an FM radio broadcast wave by multiplied waves of a communication frequency used by near field radio communication can be reduced.

2. Variation 1

A communication apparatus 100a as a variation of the above-described embodiment will be described.

In communication apparatus 100 of the above-described embodiment, the voltage value supplied to carrier generation circuit 138 of NFC circuit 106 is reduced stepwise until the audio level becomes equal to or larger than the audible threshold value, as described above.

In communication apparatus 100a, a resonance frequency is varied stepwise until the audio level becomes equal to or larger than the audible threshold value as will be described below. Communication apparatus 100a differs from communication apparatus 100 in this respect. Communication apparatus 100a is configured similarly to communication apparatus 100. Differences from communication apparatus 100 will be mainly described.

Figure 7:
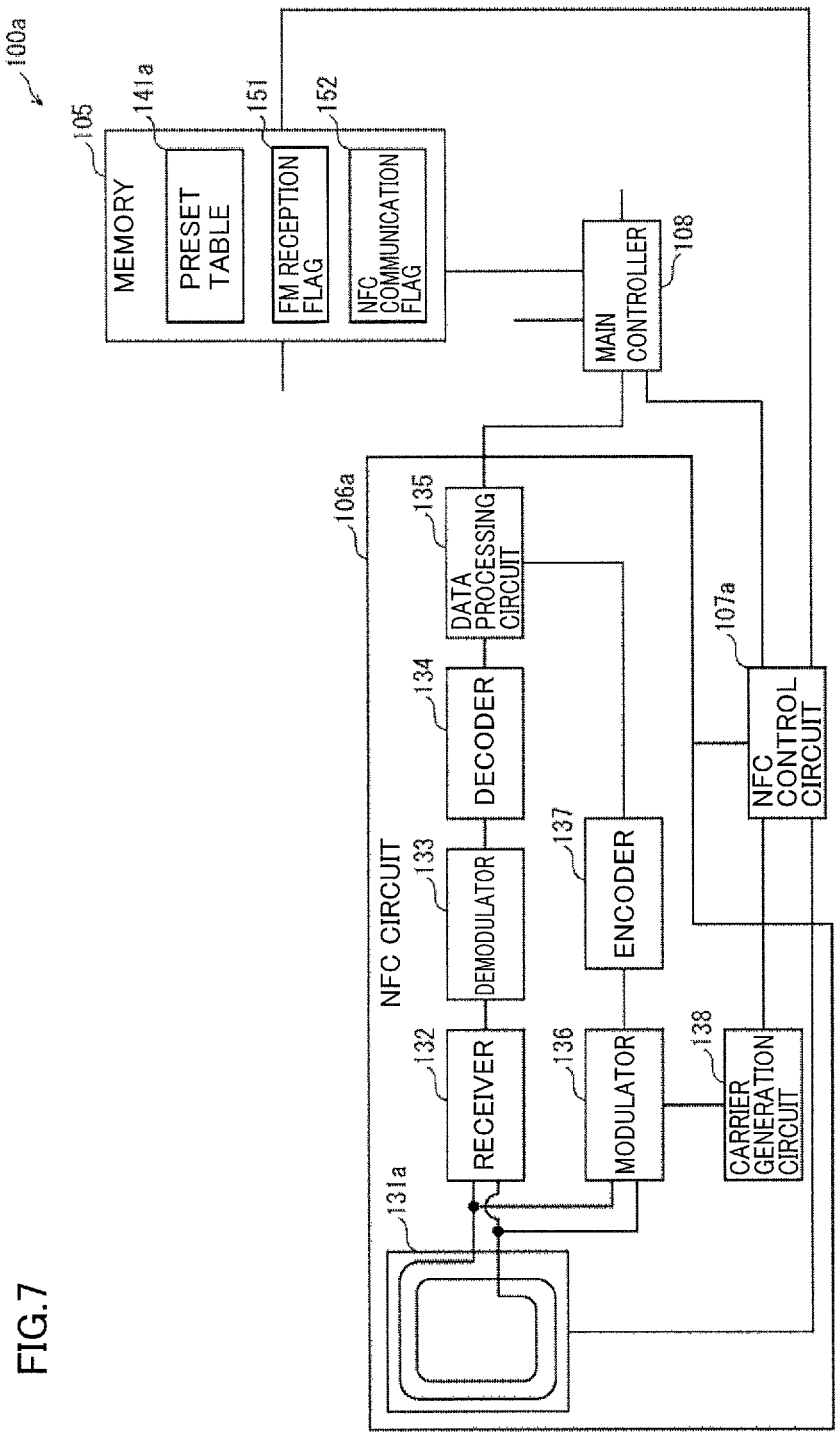
FIG. 7 is a block diagram showing a configuration of a portion of a communication apparatus according to Variation 1.

Communication apparatus 100a includes an NFC circuit 106a shown in FIG. 7 instead of NFC circuit 106 of communication apparatus 100. Communication apparatus 100a includes an NFC control circuit 107a shown in FIG. 7 instead of NFC control circuit 107 of communication apparatus 100. Memory 105 of communication apparatus 100a stores therein a preset table 141a instead of preset table 141 of communication apparatus 100.

2.1 Preset Table 141A

Preset table 141a is a data table for storing therein frequencies of FM radio broadcast waves that can be received by FM receiver 101, similarly to preset table 141, Preset table 141a includes an area for storing a plurality of pieces of preset information as shown in FIG. 8. Each piece of preset information corresponds to one FM radio broadcast wave. Each piece of preset information includes a preset number, a reception frequency, a multiplied wave flag, and a capacitor value in association with one another.

The preset number, reception frequency and multiplied wave flag are identical to those of preset table 141, respectively. The capacitor value is a capacitance set for an antenna circuit 131a of NFC circuit 106a which will be described later. Preset table 141a includes preset information 146a as an example, as shown in FIG. 8. Preset information 146a includes a preset number 142a of "2", a reception frequency 143a of "81.4", a multiplied wave flag 144a of "1", and a capacitor value 145a of "C1" in association with one another, as an example.

2.2 NFC Circuit 106a

NFC circuit 106a is configured similarly to NFC circuit 106. Differences from NFC circuit 106 will be mainly described.

As shown in FIG. 7, NFC circuit 106a includes antenna circuit 131a instead of antenna circuit 131 of NFC circuit 106.

In addition to the closed loop coil, antenna circuit 131a includes a variable capacitance diode. NFC control circuit 107a can control antenna circuit 131a to vary the capacitance of the variable capacitance diode. As a result, the resonance frequency of antenna circuit 131a varies.

2.3 NFC Control Circuit 107a

NFC control circuit 107a is configured similarly to NFC control circuit 107. Differences between NFC control circuits 107 and 107a will be mainly described.

When an FM broadcast wave is being received, that is, when FM reception flag 151 indicates "1", NFC control circuit 107a can read preset information including the reception frequency of the FM radio broadcast wave being received from preset table 141a.

When the multiplied wave flag included in the read preset information indicates "1", NFC control circuit 107a can determine whether or not the read preset information includes a capacitor value. When the read preset information includes a capacitor value, NFC control circuit 107a can set the capacitance of antenna circuit 131a of NFC circuit 106a based on the capacitor value included in the preset information.

When the read preset information does not include a capacitor value, NFC control circuit 107a can set the capacitance of antenna circuit 131a of NFC circuit 106a based on a predetermined default value. The resonance frequency of antenna circuit 131a in this case is 13.56 MHz. The default value is a capacitance set for antenna circuit 131a of NFC circuit 106a when an FM radio broadcast wave is not received simultaneously with communication by NFC, or when an FM radio broadcast wave of the reception frequency equivalent to the multiplied wave of the NFC communication wave is not received simultaneously with communication by NFC.

NFC control circuit 107a can control NFC circuit 106a to emit a carrier wave with no data signal carried thereon. Emission of a carrier wave with no data signal carried thereon may be performed continuously until immediately before emission of a carrier wave with a data signal carried thereon.

NFC control circuit 107a can compare the received audio level from level detector 103 with the audible threshold value. When the audio level is larger than or equal to the audible threshold value, NFC control circuit 107a can write the capacitor value in preset table 141a. The capacitor value written in preset table 141 is used when receiving an FM radio broadcast wave of the same frequency as the frequency of the FM radio broadcast wave being received and making communication by NFC. NFC control circuit 107a can control data processing circuit 135, encoder 137, modulator 136, antenna circuit 131a, and carrier generation circuit 138 to repeat data transmission.

When the audio level is smaller than the audible threshold value, NFC control circuit 107a can reduce the capacitor value by a change Δc. NFC control circuit 107a can exert control such that the capacitance of antenna circuit 131a of NFC circuit 106 is set based on the reduced capacitor value. Change Δc is equivalent to an increase in resonance frequency of antenna circuit 131a by 100 KHz, as an example. The resonance frequency of antenna circuit 131a may be reduced by 100 KHz. The amount of increase/decrease in resonance frequency is not limited as such. The amount of increase/decrease in resonance frequency may be 50 KHz, 150 KHz, 200 KHz, or the like.

NFC control circuit 107a can vary the resonance frequency of antenna circuit 131a within the range of 1 MHz. NFC control circuit 107a can repeat controlling emission of a carrier wave with no data carried thereon, receiving the audio level, comparing the audio level and the audible threshold value, reducing the capacitor value, and setting the capacitor value.

2.4 Characteristics of Communication Wave

A communication wave emitted from NFC circuit 106a will be described.

Figure 9A:
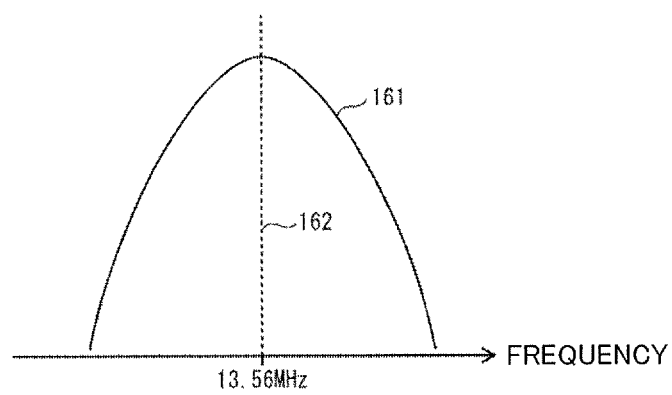
FIG. 9A shows a relation between the strength and frequency of communication waves in a communication apparatus.

When an FM radio broadcast wave is not received simultaneously with communication by NFC, or when an FM radio broadcast wave of the reception frequency equivalent to the multiplied wave of the NFC communication wave is not received simultaneously with communication by NFC, a communication wave emitted from NFC circuit 106a has characteristics as shown in FIG. 9A.

In FIG. 9A, the horizontal axis indicates the frequency, and the vertical axis indicates the strength of communication wave. As shown in this drawing, a communication wave 161 includes, as the center frequency, not only a frequency component of 13.56 MHz, but also frequencies in a narrow band having a frequency bandwidth centering on 13.56 MHz and less than or equal to a predetermined threshold value. The communication frequency by NFC matches a center frequency 162 of communication wave 161. Communication wave 161 has a peak value at center frequency 162.

Figure 9B:
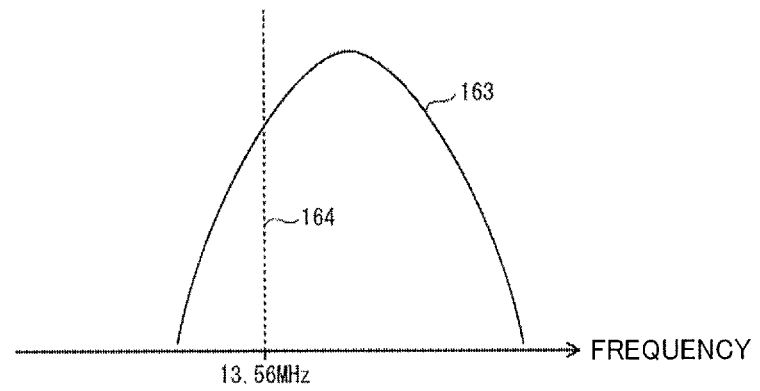
FIG. 9B shows a relation between the strength and frequency of communication waves after a communication frequency is shifted.

When receiving an FM radio broadcast wave of the reception frequency equivalent to the multiplied wave of the NFC communication wave simultaneously with communication by NFC, communication apparatus 100a varies the capacitance of antenna circuit 131a of NFC circuit 106a stepwise as described above. In this case, the communication wave emitted from NFC circuit 106a has characteristics as shown in FIG. 9B. In FIG. 9B, the horizontal axis indicates the frequency, and the vertical axis indicates the strength of communication wave. As shown in this drawing, a communication wave 163 includes frequency components in a narrow band similarly to communication wave 161 shown in FIG. 9A. Different from communication wave 161, the center frequency of communication wave 163 is shifted from the communication frequency of 13.56 MHz.

A communication frequency 164 by NFC does not match the center frequency of communication wave 163. Communication wave 163 does not have a peak value at communication frequency 164. That is, at communication frequency 164, the strength becomes lower than the peak value. The same effect as reducing the transmission power is obtained.

2.5 Operation of Communication Processing by NFC

Figure 10:
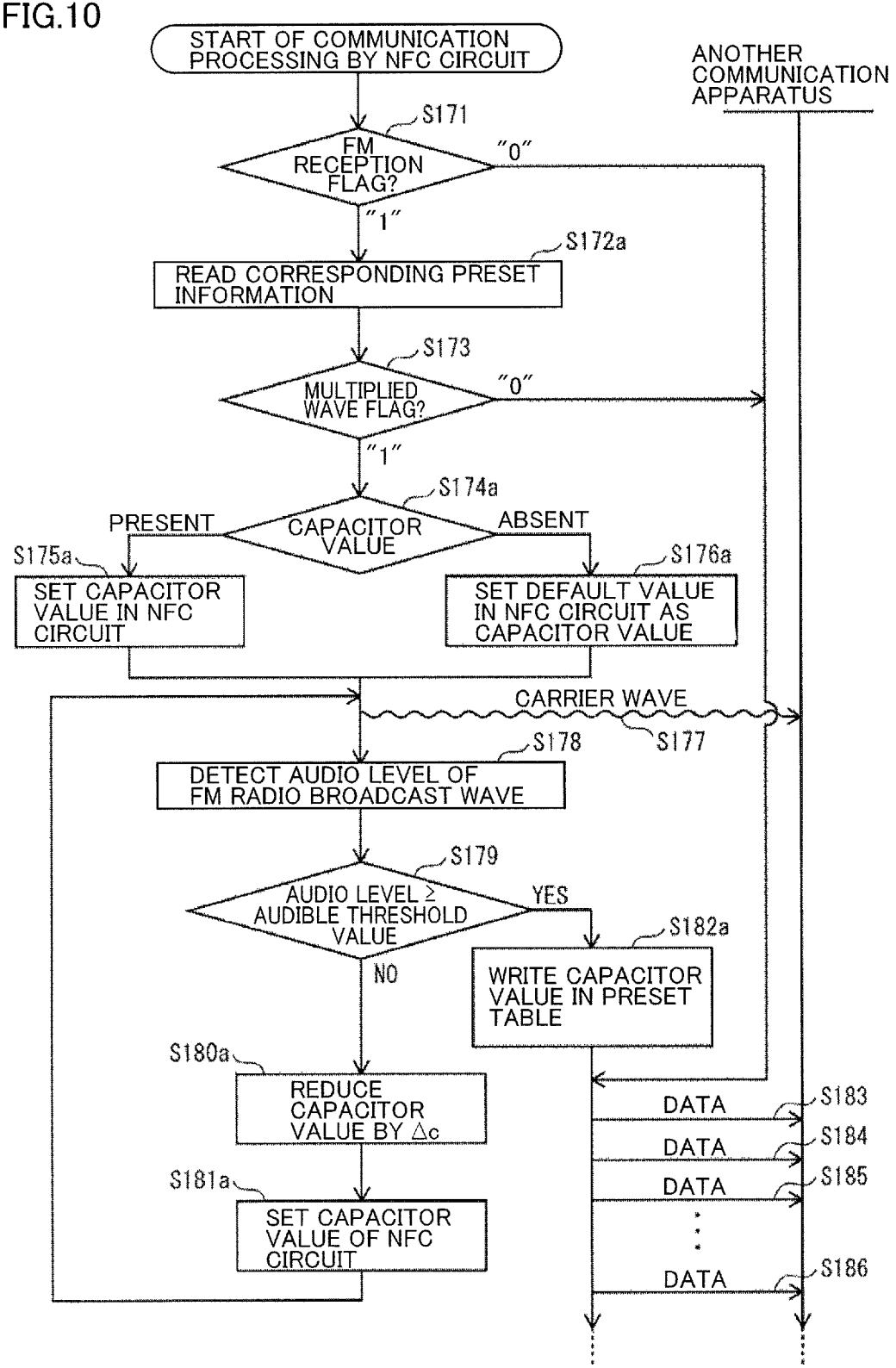
FIG. 10 is a flowchart showing an operation of communication processing in a communication apparatus.

An operation of communication processing by NFC between communication apparatuses 100a and 200 will be described with reference to the flowchart shown in FIG. 10. In the flowcharts shown in FIGS. 5 and 10, the details of the steps denoted by the same step numbers are identical.

NFC control circuit 107a can determine whether FM reception flag 151 stored in memory 105 indicates "0" or "1" (step S171). When FM reception flag 151 indicates "1" ("1" in step S171), NFC control circuit 107a can read preset information including the reception frequency of the FM radio broadcast wave being received from preset table 141a (step S172a).

NFC control circuit 107a can extract a multiplied wave flag from the read preset information. NFC control circuit 107a can determine whether the extracted multiplied wave flag indicates "0" or "1" (step S173). When the multiplied wave flag indicates "1" ("1" in step S173), NFC control circuit 107a can determine whether or not the read preset information includes a capacitor value (step S174a). When the read preset information includes a capacitor value ("present" in step S174a), NFC control circuit 107a can set the capacitance of antenna circuit 131a of NFC circuit 106a based on the capacitor value included in the preset information (step S175a).

When the read preset information does not include a capacitor value ("absent" in step S174a), NFC control circuit 107a can set the capacitance of antenna circuit 131a of NFC circuit 106a based on a default value (step S176a). NFC circuit 106a can emit a carrier wave with no data signal carried thereon (step S177).

Level detector 103 can detect the audio level of the FM radio broadcast wave, and can output the detected audio level to NFC control circuit 107a via main controller 108. NFC control circuit 107a can receive the audio level from level detector 103 via main controller 108 (step S178). NFC control circuit 107a can compare the received audio level and the audible threshold value (step S179). When the audio level is larger than or equal to the audible threshold value ("YES" in step S179), NFC control circuit 107a can write the capacitor value in preset table 141a (step S182a).

NFC control circuit 107a can cause data processing circuit 135, encoder 137, modulator 136, antenna circuit 131a, and carrier generation circuit 138 to repeat data transmission (step S183, S184, S185, . . . , S186). Communication apparatus 200 can repeat data reception (step S183, S184, S185, . . . , S186). Data transmission/reception by NFC is thereby terminated.

When the audio level is smaller than the audible threshold value ("NO" in step S179), NFC control circuit 107a can reduce the capacitor value by Δc (step S180a). NFC control circuit 107a can set the capacitance of antenna circuit 131a of NFC circuit 106a based on the reduced capacitor value (step S181a). The process returns to step S178 to repeat the processing.

When FM reception flag 151 indicates "0" ("0" in step S171) and the multiplied wave flag indicates "0" ("0" in step S173), NFC control circuit 107a shifts control to step S183.

2.6 Conclusion

As described above, the resonance frequency of NFC circuit 106a is varied by varying stepwise the capacitance of antenna circuit 131a of NFC circuit 106a until the audio level becomes equal to or larger than the audible threshold value. As a result, the transmission power at the communication frequency of the communication wave emitted from antenna circuit 131a of NFC circuit 106a can be reduced. The reception interference with an FM radio broadcast wave by multiplied waves of a communication frequency used by near field radio communication can be reduced.

3. Variation 2

A communication apparatus 100b as a variation of the above-described embodiment will be described. In communication apparatus 100 of the above-described embodiment, the voltage value supplied to carrier generation circuit 138 of NFC circuit 106 is reduced stepwise until the audio level becomes equal to or larger than the audible threshold value, as described above. The transmission power of the communication wave to be emitted is reduced accordingly.

Communication apparatus 100b restricts the voltage value supplied to carrier generation circuit 138 so as not to fall below a voltage threshold value, as will be described below. The transmission power of the communication wave to be emitted is thus prevented from being reduced without limitation. Communication apparatus 100b is configured similarly to communication apparatus 100. Differences from communication apparatus 100 will be mainly described.

An operation of communication processing by NFC between communication apparatuses 100b and 200 will be described with reference to the flowchart shown in FIG. 11.

Figure 6:
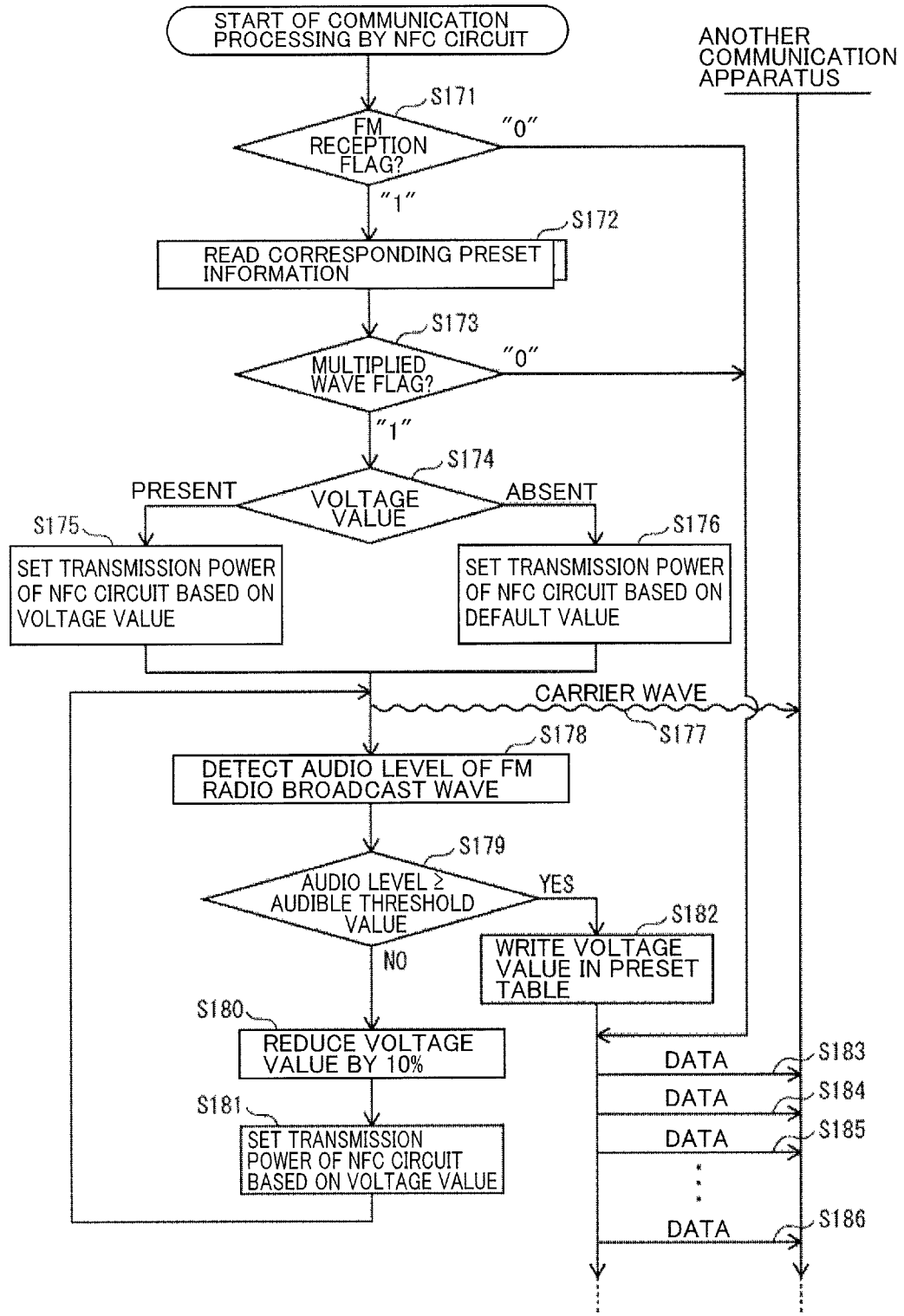
FIG. 6 is a flowchart showing an operation of communication processing in a communication apparatus.
Figure 11:
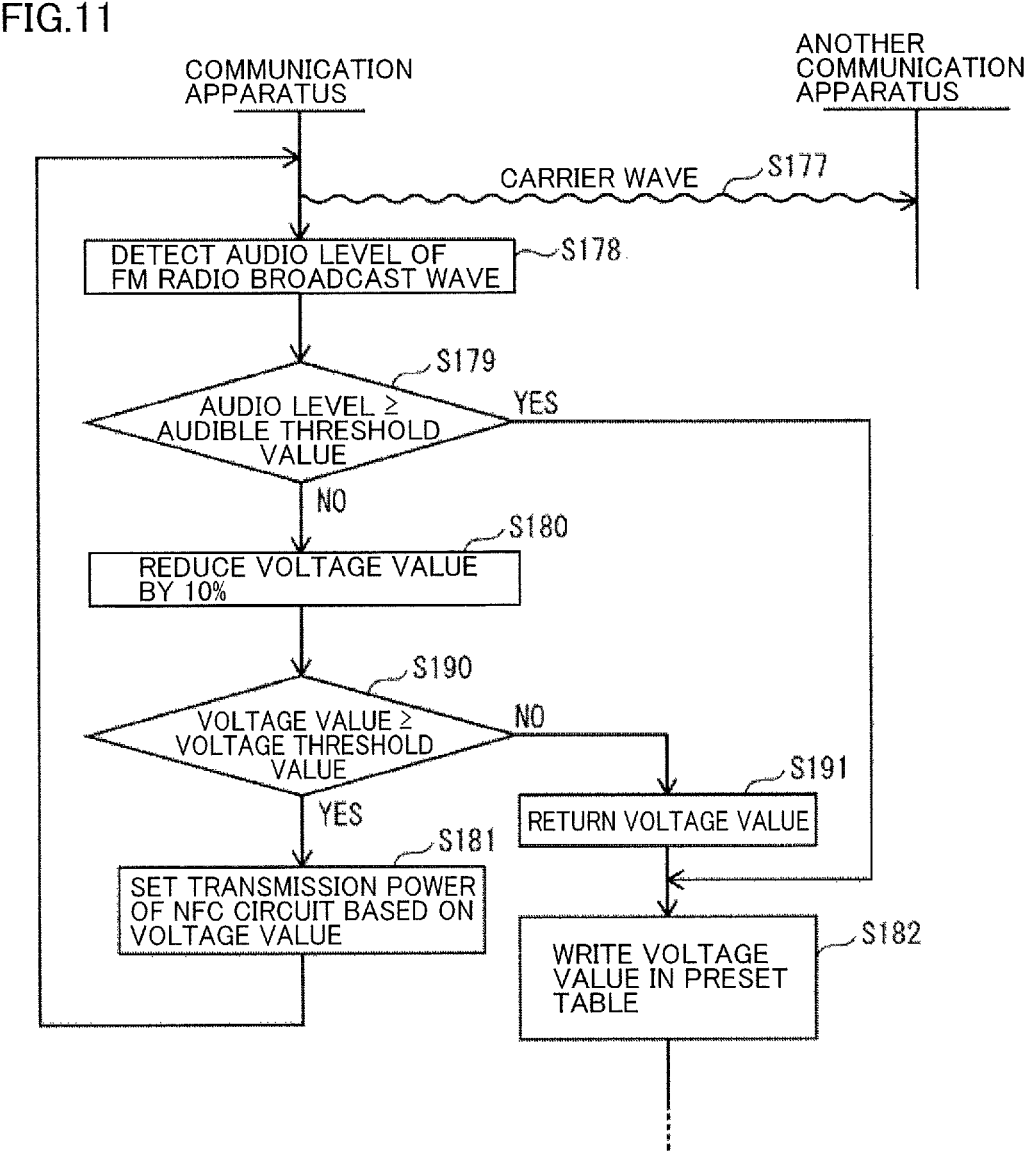
FIG. 11 is a flowchart showing an operation of communication processing in a communication apparatus according to Variation 2.

In the flowchart shown in FIG. 11, steps S190 and S191 are inserted between steps S180 and S181 of the flowchart shown in FIG. 6. In the flowcharts shown in FIGS. 6 and 11, the details of the steps denoted by the same step numbers are identical. Some of the steps shown in FIG. 6 are not illustrated in the flowchart shown in FIG. 11.

In step S180, NFC control circuit 107 can reduce the voltage value by 10%. NFC control circuit 107 can determine whether or not the reduced voltage value is more than or equal to a voltage threshold value (step S190). When the reduced voltage value is more than or equal to the voltage threshold value ("YES" in step S190), NFC control circuit 107 can set the transmission power of carrier generation circuit 138 of NFC circuit 106 based on the reduced voltage value (step S181). The process returns to step S177 to repeat the processing.

When the reduced voltage value is smaller than the voltage threshold value ("NO" in step S190), NFC control circuit 107 can return the reduced voltage value to a previous voltage value (step S191). NFC control circuit 107 can write the previous voltage value in preset table 141 (step S182). Then, data transmission/reception is performed between communication apparatuses 100b and 200.

When an FM radio broadcast wave is not received simultaneously with communication by NFC, the voltage threshold value is a value of 50% of the voltage value set for carrier generation circuit 138 of NFC circuit 106. This is an example, and the voltage threshold value is not limited to 50%. The voltage threshold value may be 65%, 60%, 55%, or the like. NFC control circuit 107 can compare transmission power with a power threshold value, and can exert control so as to reduce the transmission power of NFC circuit 106 within a range larger than or equal to the power threshold value.

As described above, if the voltage value falls below the voltage threshold value when the voltage value supplied to carrier generation circuit 138 of NFC circuit 106 is reduced stepwise until the audio level becomes equal to or larger than the audible threshold value, communication apparatus 100b returns the voltage value to the previous voltage value at that point of time. The transmission power of the communication wave to be emitted by NFC circuit 106 is thus prevented from being reduced without limitation. As a result, communication apparatuses 100b and 200 are prevented from failing to make near field radio communication by NFC.

4. Variation 3

A communication apparatus 100c as a variation of the above-described embodiment will be described.

If the voltage value falls below the voltage threshold value when reducing stepwise the voltage value supplied to carrier generation circuit 138 of NFC circuit 106, communication apparatus 100b of Variation 2 returns the voltage value to a previous voltage value at that point of time as described above.

Communication apparatus 100c determines whether or not a response from communication apparatus 200 of a communication partner has been received instead of comparing the voltage value and the voltage threshold value, and when no response has been received, returns the voltage value to a previous voltage value, as will be described below. Communication apparatus 100c is configured similarly to communication apparatus 100b. Differences from communication apparatus 100b will be mainly described.

Figure 12:
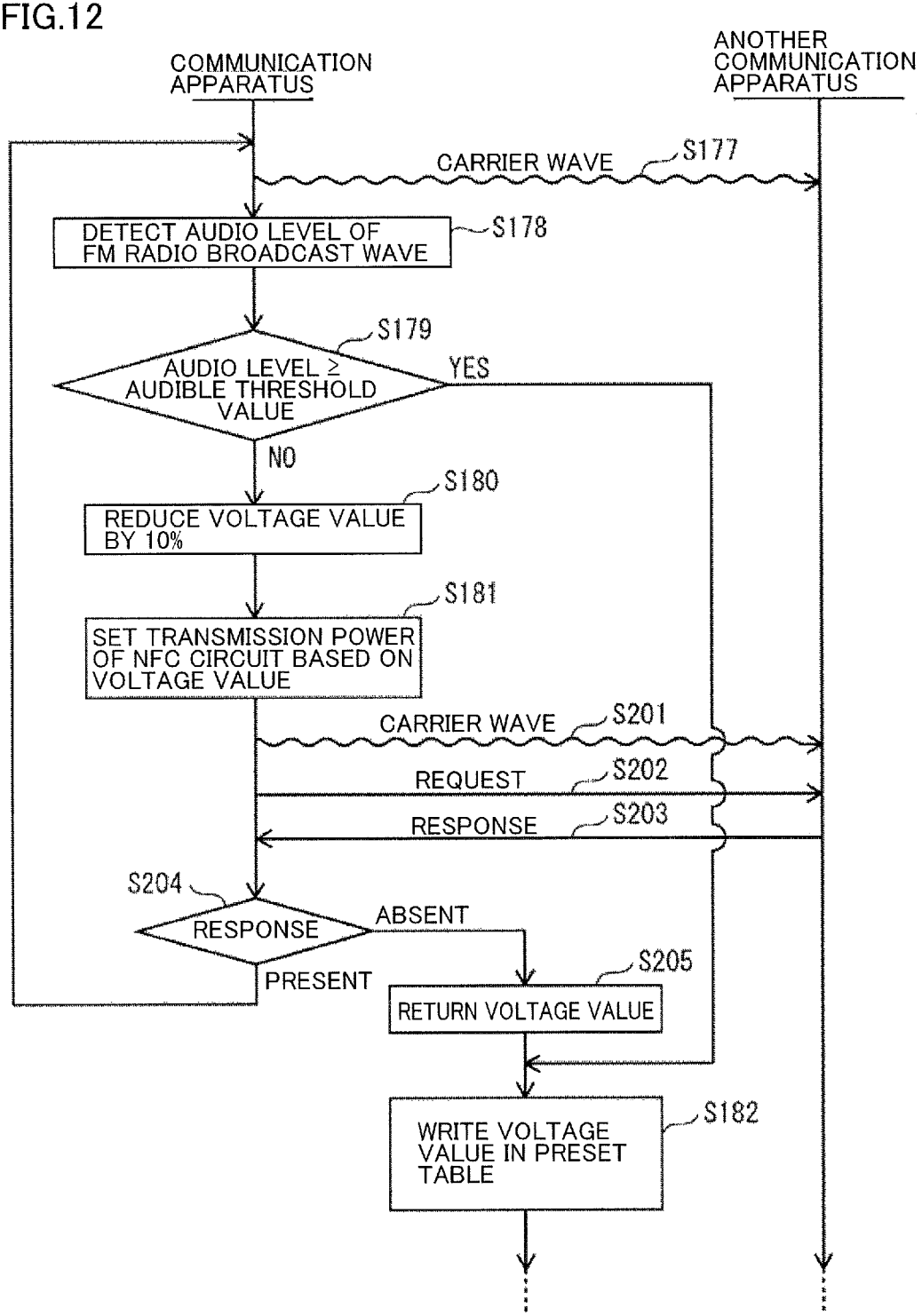
FIG. 12 is a flowchart showing an operation of communication processing in a communication apparatus according to Variation 3.

An operation of communication processing by NFC between communication apparatuses 100c and 200 will be described with reference to the flowchart shown in FIG. 12. In the flowchart shown in FIG. 12, steps S190 to S191 of the flowchart shown in FIG. 11 are eliminated, and steps S201 to S205 are added after S181. In the flowcharts shown in FIGS. 11 and 12, the details of the steps denoted by the same step numbers are identical.

In step S181, NFC control circuit 107 can set transmission power of carrier generation circuit 138 of NFC circuit 106 based on the reduced voltage value. NFC circuit 106 can emit a carrier wave with no data signal carried thereon by the control of NFC control circuit 107 (step S201). NFC circuit 106 can emit a carrier wave with a data signal indicating a request carried thereon by the control of NFC control circuit 107 (step S202). The request demands a response from communication apparatus 200.

In response to the request, communication apparatus 200 can emit a carrier wave with a data signal indicating a response carried thereon (step S203). NFC control circuit 107 can determine whether or not the response from communication apparatus 200 has been received by NFC circuit 106 (step S204). When a response has been received ("yes" in step S204), NFC control circuit 107 shifts control to step S178.

When a response has not been received ("no" in step S204), NFC control circuit 107 can return the reduced voltage value to the previous voltage value (step S205). NFC control circuit 107 can write the previous voltage value in preset table 141 (step S182). Then, data transmission/reception is performed between communication apparatuses 100c and 200.

As described above, in communication apparatus 100c, if no response has been received from communication apparatus 200 when reducing stepwise the voltage value supplied to carrier generation circuit 138 of NFC circuit 106, communication apparatus 100c returns the voltage value to the previous voltage value at that point of time as described above. The transmission power of the communication wave to be emitted by NFC circuit 106 is thus prevented from being reduced without limitation. As a result, communication apparatuses 100c and 200 are prevented from failing to make near field radio communication by NFC.

5. Variation 4

A communication apparatus 100d as a variation of the above-described embodiment will be described.

In communication apparatus 100 of the above-described embodiment, the voltage value supplied to carrier generation circuit 138 of NFC circuit 106 is reduced stepwise until the audio level becomes equal to or larger than the audible threshold value, as described above. In this way, one audible threshold value is used in communication apparatus 100.

In communication apparatus 100d, two audible threshold values 1 and 2 are used as will be described below. When the audio level is less than or equal to audible threshold value 2, the voltage value is reduced by 10%. When the audio level is larger than audible threshold value 2 and smaller than audible threshold value 1, the voltage value is reduced by 5%. When the audio level is higher than or equal to audible threshold value 1, reducing the voltage value is stopped, and near field radio communication is made between communication apparatuses 100d and 200.

Audible threshold value 1 is larger than audible threshold value 2. Audible threshold value 1 is equal to the audible threshold value in communication apparatus 100 of the above-described embodiment, Audible threshold value 1 is of a well audible level. Audible threshold value 2 is of a barely audible level.

Communication apparatus 100d is configured similarly to communication apparatus 100. Differences from communication apparatus 100 will be mainly described.

An operation of communication processing by NFC between communication apparatuses 100d and 200 will be described with reference to the flowchart shown in FIG. 13. In the flowchart shown in FIG. 13, steps S179 to S181 of the flowchart shown in FIG. 6 are eliminated. After step S178, steps S179a, S211, S212, and S181 are added. In the flowcharts shown in FIGS. 6 and 13, the details of the steps denoted by the same step numbers are identical. In the flowchart shown in FIG. 13, some of the steps shown in FIG. 6 are not illustrated.

In step S178, NFC control circuit 107 can receive the audio level from level detector 103 via main controller 108. NFC control circuit 107 can compare the received audio level with audible threshold values 1 and 2 (step S179a). When the audio level is less than or equal to audible threshold value 2 ("less than or equal to audible threshold value 2" in step S179a), NFC control circuit 107 can reduce the voltage value by 10% (step S211). The transmission power of carrier generation circuit 138 of NFC circuit 106 can be set based on the reduced voltage value (step S181). The process returns to step S177 to repeat the processing.

When the audio level is larger than audible threshold value 2 and smaller than audible threshold value 1 ("threshold 2 to threshold 1" in step S179a), NFC control circuit 107 can reduce the voltage value by 5% (step S212). NFC control circuit 107 can set the transmission power of carrier generation circuit 138 of NFC circuit 106 based on the reduced voltage value (step S181). Next, the process returns to step S177 to repeat the processing.

When the audio level is larger than or equal to audible threshold value 1 ("more than or equal to audible threshold value 1" in step S179a), NFC control circuit 107 can write the voltage value in preset table 141 (step S182). Near field radio communication can be made between communication apparatuses 100d and 200. Communication processing is terminated.

As described above, two audible threshold values 1 and 2 are used in communication apparatus 100d. When the audio level is less than or equal to audible threshold value 2, the reduction rate of the voltage value is large. When the audio level is larger than audible threshold value 2 and smaller than audible threshold value 1, the amount of reduction in voltage value is small. In this way, the reduction rate of voltage value is made smaller as the audio level approaches audible threshold value 1. When the audio level becomes larger than audible threshold value 1, the likelihood that the audio level greatly exceeds audible threshold value 1 can be reduced. As a result, communication apparatuses 100d and 200 are prevented from failing to make near field radio communication by NFC.

6. Other Variations

The present disclosure has been described based on the above-described embodiment and variations, but is not limited to the above-described embodiment and variations. Modifications may be made as will be described below.

(0) The wireless communication applied between communication apparatuses 100 and 200 is not limited to NFC. A multiplied frequency of a communication frequency used in wireless communication may fall on a reception frequency of FM radio broadcasting.

(1) Instead of the audio level, when an intermediate frequency signal output from amplitude limiting circuit 126, from which a portion with more than or equal to a certain amplitude has been removed, is amplified and rectified to extract a reception strength signal indicating the reception strength of an FM radio broadcast wave, and the extracted reception strength signal is more than or equal to a predetermined threshold value, near field radio communication may be made. When the reception strength signal is less than the predetermined threshold value, control may be exerted so as to reduce the voltage value to be supplied to carrier generation circuit 138 until the reception strength signal becomes more than or equal to the predetermined threshold value. Instead of the audio level, the ratio between the above-described reception strength signal of an FM radio broadcast wave and a noise signal output from noise amplification and rectification circuit 129 may be used.

(2) Communication apparatus 100 may include a speaker. Communication apparatus 100 may include an antenna for FM radio broadcasting.

(3) A communication partner is not limited to communication apparatus 200. Communication apparatus 200 may be a ticket machine of train tickets, an automatic ticket gate of a railroad, a register installed in a store, a gate-control device at an event hall, an automatic vending machine of goods, such as tobacco, canned coffee, and canned juice, as well as a PC (personal computer).

(4) Preset table 141 is used in communication apparatus 100, but this is not a limitation. A user may select an FM radio broadcast wave without using preset table 141, and may each time determine whether or not the reception frequency of the FM radio broadcast wave is a multiplied wave.

(5) In the above-described embodiment and each variation, when reducing the voltage value supplied to carrier generation circuit 138 of NFC circuit 106 to reduce the transmission power of the communication wave to be emitted, NFC control circuit 107 may output a signal indicating that the transmission power of a communication wave is reduced to main controller 108. Upon receipt of the signal, main controller 108 can generate an icon or message indicating that the transmission power of the communication wave is reduced based on the signal, and can output the generated icon or message to touch panel 109. Display panel 109b of touch panel 109 can display the received icon or message. Communication apparatus 100 may include an LED (Light Emitting Diode) in a manner exposed on the front surface thereof, and main controller 108 may turn on or blink the LED based on the signal. In this manner, a user can be informed of reducing the transmission power of the communication wave.

In the above-described embodiment and each variation, when the reception frequency of the FM radio broadcast wave is a multiplied wave of the NFC communication wave, that is, when the reception frequency of the FM radio broadcast wave and the multiplied wave of the NFC communication wave interfere with each other, NFC control circuit 107 may output a signal indicating that interference has occurred to main controller 108. Upon receipt of the signal, main controller 108 can generate an icon or message indicating that the interference has occurred based on the signal, and can output the generated icon or message to touch panel 109. Display panel 109b of touch panel 109 can display the received icon or message. Communication apparatus 100 may include an LED (Light Emitting Diode) in a manner exposed on the front surface thereof, and main controller 108 may turn on or blink the LED based on the signal. In this manner, a user can be informed of the occurrence of interference between the reception frequency of the FM radio broadcast wave and the multiplied wave of the NFC communication wave.

(6) Each device is a computer system including at least one processor and a memory. The memory stores a computer program therein, and the at least one microprocessor may operate in accordance with the computer program.

In accordance with various embodiments, the at least one processor may be implemented as a single integrated circuit (IC) or as multiple communicatively coupled IC's and/or discrete circuits. It is appreciated that the at least one processor can be implemented in accordance with various known technologies. In one embodiment, the processor includes one or more circuits or units configurable to perform one or more data comprising procedures or processes.

For example, the processor may include one or more processors, controllers, microprocessors, microcontrollers, application specific integrated circuits (ASICs), digital signal processors, programmable gate arrays, or any combination of these devices or structures, on other known devices and structures, to perform the functions described above.

A computer program is a combination of a plurality of instruction codes each indicating an instruction to a computer in order to achieve a predetermined function. The computer program may be recorded on a computer-readable recording medium, such as, for example, a flexible disk, hard disk, CD-ROM (Compact Disc Read Only Memory), MO (Magneto-Optical disc), DVD (Digital Versatile Disc), DVD-ROM (Digital Versatile Disc Read Only Memory), DVD-RAM (Digital Versatile Disc Random Access Memory), a Blu-ray Disc, a semiconductor memory, and the like. A computer program may be transmitted via an electric telecommunication line, wireless or wire communication line, a network represented by the Internet, data broadcasting, or the like.

A computer program recorded on the above-described recording medium may be transferred or a computer program may be transferred via a network or the like to be executed by another independent computer system.

(7) The above-described embodiment and variations may be combined, respectively.

Although the present disclosure has been described and illustrated in detail, it is clearly understood that the same is by way of illustration and example only and is not to be taken by way of limitation, the scope of the present disclosure being interpreted by the terms of the appended claims.

The invention claimed is:

1. A communication apparatus comprising:
a wireless communication unit configured to make wireless communication with a communication apparatus of a communication partner using a communication frequency specified;
an FM receiver configured to adjust a radio reception range to a band including a multiplied frequency of the communication frequency;
a detector configured to detect a reception level of the band when the FM receiver receives the band including the multiplied frequency; and
at least one processor configured to control the wireless communication unit to reduce transmission power in the wireless communication when the reception level is smaller than a predetermined threshold value.

2. The communication apparatus according to claim 1, wherein the at least one processor is configured to reduce the transmission power stepwise until the reception level becomes equal to or larger than the predetermined threshold value.

3. The communication apparatus according to claim 2, wherein the at least one processor is further configured to compare the transmission power with a power threshold value, and reduce the transmission power within a range in which the transmission power is larger than or equal to the power threshold value.

4. The communication apparatus according to claim 3, wherein
the wireless communication unit includes:
a generation circuit configured to generate a carrier wave of the communication frequency;
a modulator configured to modulate the carrier wave using data to be transmitted to the communication apparatus of the communication partner; and
an antenna circuit configured to emit the modulated carrier wave as a communication wave,
the wireless communication unit is configured to reduce a supply voltage to the generation circuit to reduce the transmission power.

5. The communication apparatus according to claim 3, wherein
the wireless communication unit is configured to emit the communication wave including a frequency within a narrow band centering on the communication frequency, and
the at least one processor is configured to control the wireless communication unit so as to shift a center frequency of the narrow band to reduce the transmission power.

6. The communication apparatus according to claim 5, wherein the wireless communication unit includes:
a generation circuit configured to generate a carrier wave of the communication frequency;
a modulator configured to modulate the carrier wave using data to be transmitted to the communication apparatus of the communication partner; and
an antenna circuit configured to emit the modulated carrier wave as a communication wave,
the wireless communication unit is configured to vary a capacitance of the antenna circuit so as to shift the center frequency of the narrow band.

7. The communication apparatus according to claim 1, wherein the at least one processor is configured to control the wireless communication unit to reduce the transmission power in the wireless communication within a range in which the wireless communication is possible when the reception level is smaller than the predetermined threshold value.

8. A control method of controlling a communication apparatus including a wireless communication unit and an FM receiver, the wireless communication unit being configured to make wireless communication with a communication apparatus of a communication partner using a specified communication frequency, the FM receiver being configured to adjust a radio reception range to a band including a multiplied frequency of the communication frequency, the control method comprising:
detecting a reception level of the band when the FM receiver receives the band including the multiplied frequency; and
controlling the wireless communication unit to reduce transmission power in the wireless communication unit when the reception level is smaller than a predetermined threshold value.

* * * * *